US010896412B2

(12) United States Patent
Robertson et al.

(10) Patent No.: US 10,896,412 B2
(45) Date of Patent: Jan. 19, 2021

(54) TRUSTLESS PHYSICAL CRYPTOCURRENCY

(71) Applicant: Airtime Network, Inc., San Mateo, CA (US)

(72) Inventors: Charles Cameron Robertson, Palo Alto, CA (US); Tilman Heiner Drerup, Palo Alto, CA (US); Paul Michael Gerhardt, Oakland, CA (US); David Joshua Myers, Oakland, CA (US)

(73) Assignee: Airtime Network, Inc., San Mateo, CA (US)

( * ) Notice: Subject to any disclaimer, the term of this patent is extended or adjusted under 35 U.S.C. 154(b) by 45 days.

(21) Appl. No.: 16/351,478

(22) Filed: Mar. 12, 2019

(65) Prior Publication Data

US 2020/0294011 A1 Sep. 17, 2020

(51) Int. Cl.
| | |
|---|---|
| *G06Q 20/10* | (2012.01) |
| *G06Q 20/40* | (2012.01) |
| *H04L 9/32* | (2006.01) |
| *H04L 9/06* | (2006.01) |
| *H04L 9/30* | (2006.01) |
| *G06Q 20/06* | (2012.01) |

(52) U.S. Cl.
CPC ......... *G06Q 20/105* (2013.01); *G06Q 20/065* (2013.01); *G06Q 20/405* (2013.01); *H04L 9/0637* (2013.01); *H04L 9/3066* (2013.01); *H04L 9/3278* (2013.01)

(58) Field of Classification Search
None
See application file for complete search history.

(56) References Cited

U.S. PATENT DOCUMENTS

| | | | | |
|---|---|---|---|---|
| 10,002,362 | B1* | 6/2018 | Endress | .................. G09C 1/00 |
| 10,057,243 | B1* | 8/2018 | Kumar | ................. H04L 9/0825 |
| 10,193,695 | B1* | 1/2019 | Endress | ............... H04L 9/3239 |
| 2015/0371224 | A1 | 12/2015 | Lingappa | |
| 2017/0232300 | A1 | 8/2017 | Tran | |
| 2018/0097639 | A1* | 4/2018 | Gulati | .................. H04L 9/3263 |
| 2018/0309570 | A1 | 10/2018 | Amini et al. | |
| 2019/0052461 | A1* | 2/2019 | Kreder, III | ............. G06F 21/78 |
| 2019/0163912 | A1* | 5/2019 | Kumar | ................. G06F 21/575 |

OTHER PUBLICATIONS

Trusted Platform Module Library, Part 1: Architecture, Family "2.0," Level 00, Revision 01.38, Trusted Computing Group [online], Sep. 29, 2016 [retrieved on Jun. 27, 20197]. Retrieved from the Internet: <URL https://trustedcomputinggroup.org/wp-content/uploads/TPM-Rev-2.0-Part-1-Architecture-01.38.pdf>.*
International Search Report in International Application No. PCT/US2020/022276, dated Jun. 12, 2020.

* cited by examiner

*Primary Examiner* — Jamie R Kucab
(74) *Attorney, Agent, or Firm* — Cognition IP, P.C.; Edward Steakley (57) ABSTRACT

A physical cryptocurrency may comprise a physical medium and an attached processor. The processor may generate a public-private key pair, or the public-private key pair may be generated in a secure and auditable manner external to the processor and stored on the processor. The private key may enable execution of a smart contract on a blockchain to transfer an asset from a starting address to a destination address on the blockchain.

8 Claims, 6 Drawing Sheets

TRUSTLESS PHYSICAL CRYPTOCURRENCY

BACKGROUND

Cryptocurrencies are a novel technology for enabling the exchange of digital currencies. Cryptocurrencies are not backed by physical assets like gold and do not require the backing or faith and trust in any government. Instead, cryptocurrency is implemented using a set of decentralized servers, which may append transactions to a general ledger through various trustless techniques. For example, many current approaches are based on cryptographic techniques. These techniques enable the trustless nature of cryptocurrency, where value may be exchanged by users without having to trust a central party as an intermediary.

The ownership of a given portion of cryptocurrency is typically represented by a public-private key pair referred to as a "wallet". The private key allows the owner of a given cryptocurrency to cryptographically sign messages—or "transactions"—that indicate they are transferring ownership of all or a portion of the cryptocurrency they hold to another user's public key pair.

Unfortunately, the technical difficulty of managing a public-private key pair is significant; a user must understand that the private key must be preserved at all costs. The loss of a private key means loss of access to all associated funds in their wallet. Along with that the user must also be savvy enough to own and operate the correct software to initiate a transaction.

Typically the key pair and digital address used to send cryptocurrency to another user is represented by a long string of arbitrary numbers and letters. Transposing even a single character of the receiving address means that the funds may never arrive at their intended destination and may potentially be lost from the sum total of all cryptocurrency in circulation as a result.

It would be desirable to develop a system where cryptocurrency is as easy to use as physical currency, such as bills, coins, and prepaid cards. This would help cryptocurrency be more accessible to many more people, who may be less technologically savvy or may not want to deal with the hassles involved in current cryptocurrency systems.

Concurrently, the field of innovation in paper currency has, at length, incorporated features that are intended to preclude counterfeiting, including holograms, reflective coatings, metal strips, the use of specialized papers and more. While it may be possible to issue the same form of currency for a cryptocurrency, this would inherently defeat the decentralized nature of it by creating a new central authority backing the value of the currency.

A slight improvement to this is art suggesting that an authority or persons could incorporate a public-private key pair directly into the paper currency or a paper currency alternative such as a secure device. Then, tamperproof features could indicate if someone attempted to extract the private key from the secure device.

However, a fundamental and as-yet unsolved problem in current physical manifestations of cryptocurrency is the requirement that the manufacturer of the physical cryptocurrency be trusted. Current physical cryptocurrency loses the benefits of trustlessness of digital cryptocurrency because the user must trust the manufacturer (e.g., mint or printer) of the physical cryptocurrency. In current methods, the creator of such a physical cryptocurrency has the power to clone the private keys at the time of manufacture, thus extracting the value of the wallet held on the secure device at any point in the future.

Even if the subsequent holder of a secure device was able to audit the secure device in order to sign a proof with the private keys, and thus indicate that the cryptocurrency from the wallet were not spent, there would be no guarantees that the manufacturer of the physical cryptocurrency could not extract the funds in the future.

Another problem with current physical cryptocurrency based schemes is that the private key for the associated cryptocurrency is tied directly to the physical currency. This means that the user who currently holds the physical currency has full control of the cryptocurrency and may transfer the cryptocurrency to another location, such as the user's own wallet. Once the cryptocurrency is transferred away from the physical cryptocurrency to a user's wallet, the physical cryptocurrency is essentially useless. This means that physical currency may need to be quickly taken out of circulation due to users transferring the cryptocurrency to a different wallet on the blockchain that backs the physical currency.

A further issue with current physical cryptocurrency schemes is that they must directly support the cryptographic methods employed by a given blockchain in order to store an associated digital asset. This is problematic as existing computer software and hardware may not be designed to support the cryptographic methods selected by a given blockchain, precluding their usage for physical cryptocurrency schemes. For instance, many blockchains only support the secp256k1 elliptic curve for cryptocurrency assets, but most secure processors only support the secp256r1 elliptic curve.

Therefore, due at least to the three problems of requiring trust in the manufacturer of the physical cryptocurrency, the fast decirculation of physical cryptocurrency due to the transfer of the underlying digital cryptocurrency assets, and the usage of less supported cryptographic schemes in existing hardware and software, others have not been successful in creating a widely accessible physical cryptocurrency system.

SUMMARY

One embodiment relates to a physical cryptocurrency comprising a physical medium and an attached processor. The processor may generate a public-private key pair, or, in one embodiment, the public-private key pair may be generated in a secure and auditable manner external to the processor and stored on the processor. The private key may directly or indirectly enable execution of functions in a smart contract on a blockchain. These may include functions to transfer an asset from a starting address to a destination address on the blockchain.

One embodiment relates to a physical currency comprising a processor for self-generating a private key and corresponding public key, where the private key cannot be revealed by any designed function of the processor or any functions executing on the processor. The processor may be configured to sign a digital challenge using the private key. To execute any of the smart contract's functions, the smart contract may require a valid digital challenge signed by the processor. The smart contract may verify the validity of a digital challenge using the information stored in itself or other smart contracts.

One embodiment relates to a physical currency comprising a processor for self-generating a private key and corresponding public key, where the private key cannot be revealed by any designed function of the processor. The processor may be configured to sign a digital challenge using the private key. When presented with a valid digital challenge signed by the processor, the smart contract may enable transfer of an asset from an originating address on the blockchain to a user-specified destination address.

One embodiment relates to a physical cryptocurrency comprising a physical medium and an attached processor. The processor may generate a public-private key pair, or, in one embodiment, the public-private key pair may be generated in a secure and auditable manner external to the processor and stored on the processor. The private key may directly or indirectly, alone or in collaboration with other processors, enable execution of functions in a smart contract on a blockchain. These may include functions to transfer an asset from a starting address to a destination address on the blockchain.

In one embodiment, the private key is generated using a physically unclonable function (PUF). The PUF may generate the private key based on variations in a physical microstructure of the processor.

In one embodiment, the smart contract includes a time lock that prevents transfer of the asset until a predefined date or time.

In one embodiment, the processor is configured to generate the private key and public key using elliptic curve cryptography.

In one embodiment, the processor is configured to attest that the private key was generated by the processor and not generated externally.

In one embodiment, the processor is configured to generate the private key and public key using microcode only, without firmware or software.

In one embodiment, the physical currency further comprises electrical connections for detecting physical damage or changes to the physical currency.

One embodiment relates to a method for transfer of an asset on a blockchain using a physical currency. The method may comprise: generating, by a processor attached to a physical currency, a private key and corresponding public key; storing, by the processor, the private key in a memory such that it cannot be revealed by any designed function of the processor; receiving, by the processor, a digital challenge that may originate from a smart contract or blockchain derived information; signing, by the processor, the digital challenge using the private key; transmitting to the smart contract, by the processor, the signed digital challenge for verification and a request to execute the smart contract to transfer an asset from a private address to a destination address.

In one embodiment a plurality of additional processors or private keys may be required to sign one or more digital challenges to transfer an asset or carry out another smart contract function in conjunction with the processor.

In one embodiment, the smart contract is linked to a second smart contract. The second smart contract represents a digital asset, such as stock certificates or other assets.

In one embodiment, processor may use methods other than public key cryptography to prove possession of secret information that enables execution of the smart contract. In one embodiment, processor may prove possession of the secret information by using zero knowledge proofs such as zkSNARKs or zkSTARKs.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, a brief summary of which is provided below.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Logical and structural changes can be made to the examples of the various implementations without departing from the spirit and scope of the present teachings. The following detailed description is, therefore, not to be taken in a limiting sense and the scope of the present teachings is defined by the appended claims and their equivalents.

In addition, it should be understood that steps of the examples of the methods set forth in the present disclosure can be performed in different orders than the order presented in the present disclosure. Furthermore, some steps of the examples of the methods can be performed in parallel rather than being performed sequentially. Also, the steps of the examples of the methods can be performed in a network environment in which some steps are performed by different computers in the networked environment.

Some implementations are implemented by a computer system. A computer system can include a processor, a memory, and a non-transitory computer-readable medium. The memory and non-transitory medium can store instructions for performing methods and steps described herein.

An embodiment herein relates to systems and methods for creating a secure processor that may be attached to a physical medium for use as a physical cryptocurrency. The term "processor" encompasses, for example and without limitation, microprocessors, microcontrollers, digital signal processors (DSP), special purpose processors, general purpose processors, integrated circuits, computer chips, and other processing devices. In one embodiment, the processor generates a public-private key pair. In one embodiment, the processor includes no designed function that would reveal the private key or data allowing for the derivation thereof. In one embodiment, internal access to the private key is limited to executing only cryptographic functions which do not reveal the private key, or functions which do not reveal data that can be used to derive the private key. This enables the processor to securely generate a private key in a way that is not readable, copyable or derivable by the manufacturer of the processor. This is in contrast to some traditional methods where private keys or cryptographic seeding material are generated by a manufacturer on a computer system external to the processor and transmitted or written to the processor, which is insecure due to the ability of the manufacturer to read, copy, or derive those private keys from the cryptographic seeding material and thereby have access to the underlying cryptocurrency. Moreover, because there is no designed function for revealing the private key on the secure processor, the manufacturer, nor any other user, is able to read the private key after it is generated. This enables a trustless system where the user does not need to trust that the manufacturer of the processor has not copied the private key or the seeding material used to generate the private key.

In one embodiment, the private key on the processor enables access to a smart contract on a blockchain by direct or indirect means. The smart contract may comprise executable code on a blockchain. Smart contracts may be self-executing in that they do not rely on a central authority for enforcement and instead execute themselves through operation of the blockchain, once predefined conditions are met. In an embodiment, the smart contract may comprise self-executing code that controls access to a digital asset. The digital asset may be any kind of asset, and it may be cryptocurrency, such as Bitcoin, Ether, XRP, Dai, Lumens and others, non-fungible items that have been added to a blockchain (e.g., stock certificates, real estate, etc.), a second smart contract, traditional currency, or other assets. In some embodiments, the smart contract may control access to a second smart contract that represents another asset. In an embodiment, the smart contract may include functionality to check the value or existence of the asset associated with the smart contract and to transfer the asset to a different wallet.

In one embodiment, the smart contract may be the owner of digital assets. The smart contract may be associated with the processor by storing the public key corresponding to the private key generated by the processor, or information from which the public key can be derived. Transfer of these assets to a different owner may require the smart contract to be presented with a digital challenge that was signed by the processor. The digital challenge may be any computerized value, such as a long string of numbers or characters or hash value. The processor may receive the digital challenge and sign it with the private key. The processor may then transmit the signed digital challenge to the smart contract by direct or indirect means. The smart contract may verify that the processor holds the private key by using the digital challenge, the signed digital challenge, and the public key. Having thus verified that the digital challenge was signed by the processor, the smart contract may then immediately execute, or allow execution at the request of the user.

In one embodiment, the smart contract includes one or more conditions, where the smart contract will not execute until those conditions are met, even if the processor proves ownership of the private key. For example, in one embodiment, the smart contract will only execute after a predefined date or time has passed. This time locking feature enables the physical cryptocurrency to remain in circulation and be passed around as currency while continuing to be backed by digital assets. Users can have confidence that the digital assets backing the physical cryptocurrency will remain available until the time-lock date or time has occurred. This is unlike prior approaches where the cryptocurrency backing a physical cryptocurrency is made available for transfer by the user right away, and once transferred, renders the physical cryptocurrency immediately obsolete.

In one embodiment, the processor uses cryptographic methods that are distinct from those used by the underlying blockchain. For example, in one embodiment the processor may support the elliptic curve secp256r1 scheme for generating a public-private key pair whereas the blockchain with which the smart contract is associated natively operates with public-private key pairs based on elliptic curve secp256k1. Support for the processor's elliptic curve or alternative cryptographic scheme may be added into the code of the smart contract such that the smart contract may carry out cryptographic operations, such as but not limited to verification and public key recovery, that are compatible with the processor's native operation.

Figure 1:
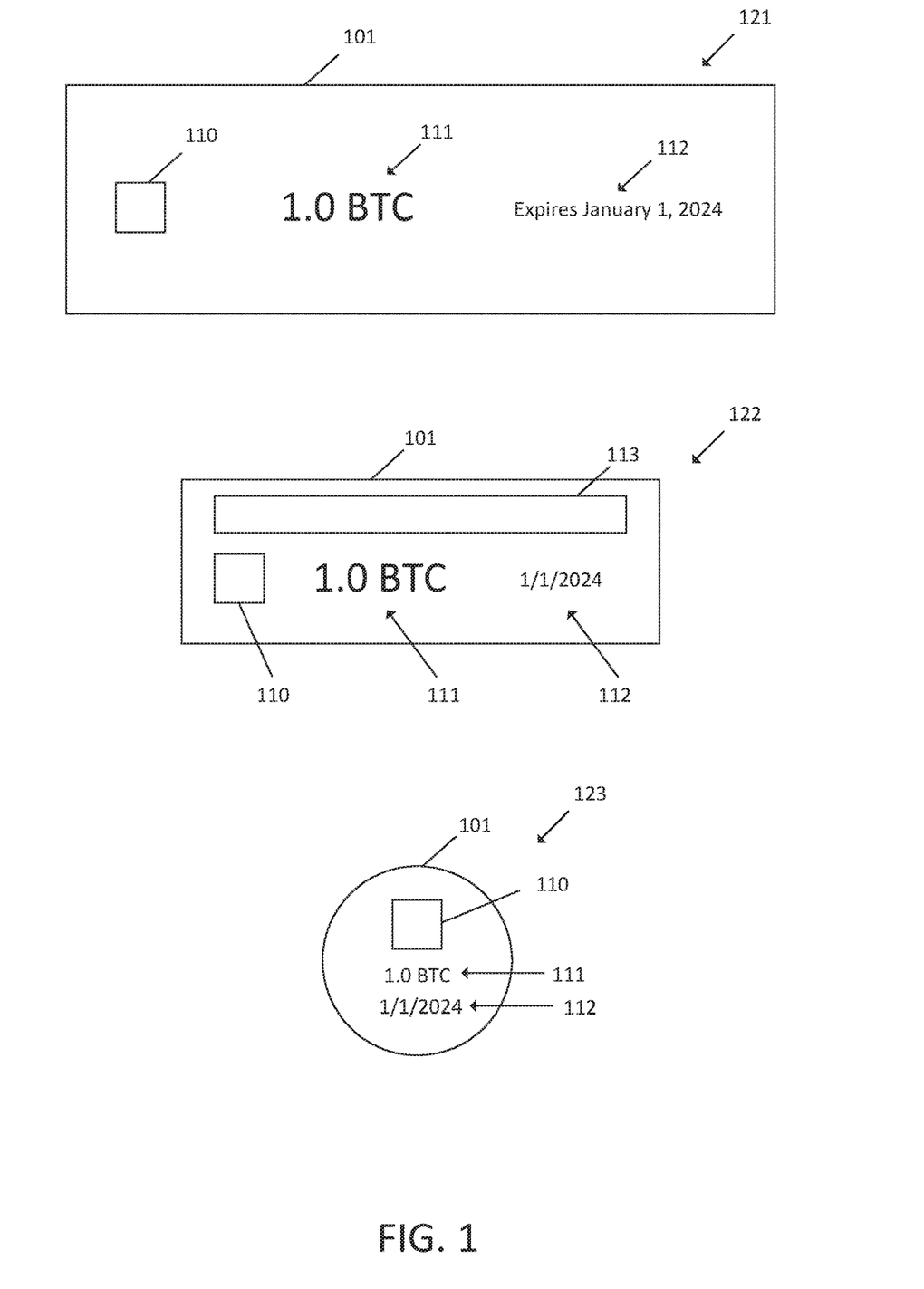
FIG. 1 illustrates exemplary embodiments of a physical currency backed by cryptocurrency.

FIG. 1 illustrates exemplary embodiments of a physical currency backed by cryptocurrency, which may be referred to as a physical cryptocurrency. The physical cryptocurrency may comprise a physical medium 101, such a bill 121, prepaid card 122, coin 123, or other physical formats including credit cards, gift cards, paper tickets, or other stores of value. Physical medium 101 may comprise, for example, paper, plastic, fabric, metal, or other materials.

A processor 110 may be attached to the physical medium 101, such as by direct embedding, fastening, gluing, or permanent or removable attachment. The physical medium may also have printed or denoted on it an indication of the asset associated with the physical cryptocurrency 111 and an expiration date or time of the physical cryptocurrency 112. In one embodiment, the asset is an amount of cryptocurrency. Physical medium 101 may include a computer-readable element 113, such as a magnetic strip, optical strip, or quick-response (QR) code that encodes information such as the indication of the asset 111 or the expiration date 112. In one embodiment, the physical medium 101 may also include a unique serial number.

Figure 2:
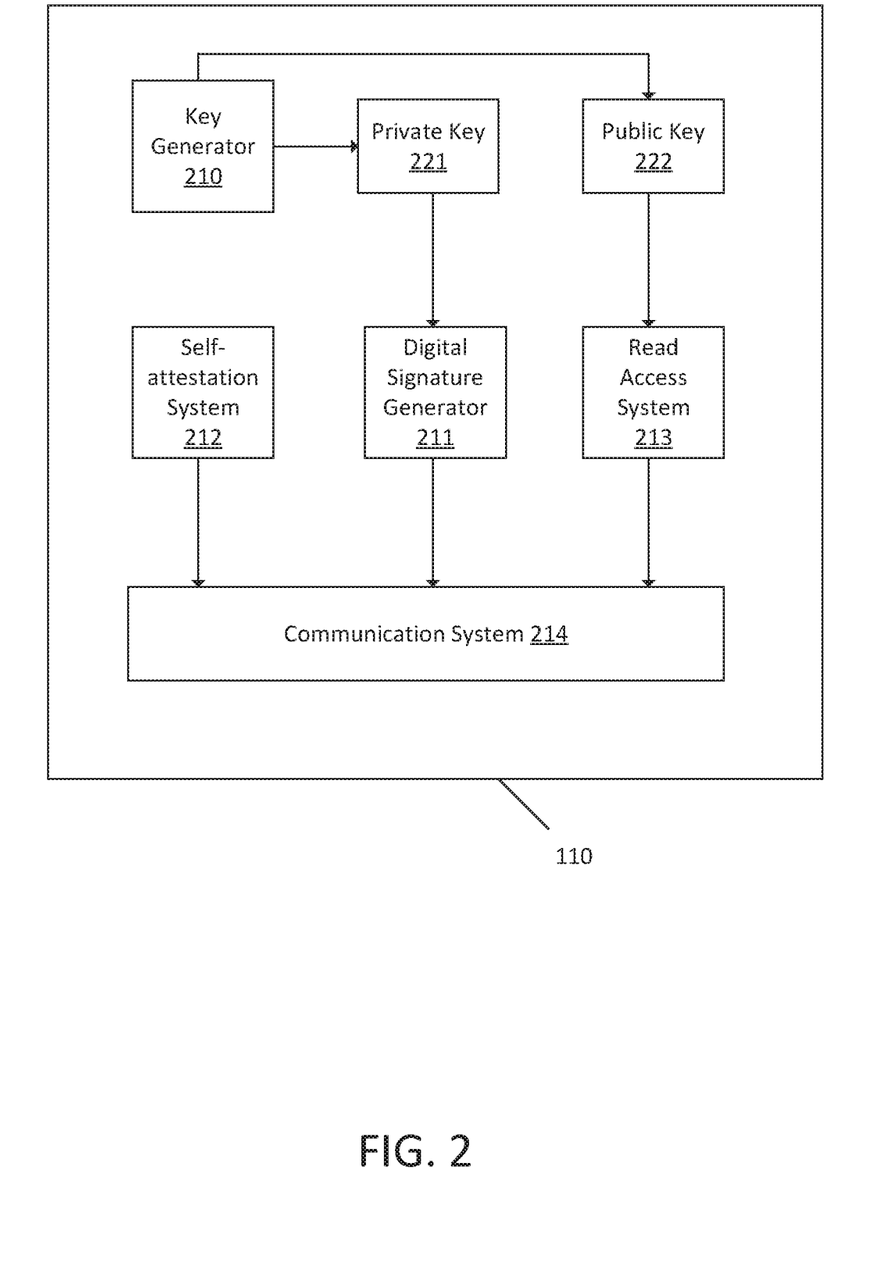
FIG. 2 illustrates an exemplary embodiment of a processor.

FIG. 2 illustrates an exemplary embodiment of processor 110. The processor may include a key generator 210 that is configured to generate private key 221 and public key 222. The private key 221 and public key 222 may be stored in on-chip memory. Communication system 214 may allow transmitting and receiving data with external computer systems. Communication system 214 may comprise a wireless communication system such as, and without limitation, a radio transmitter, Bluetooth communication system, Wi-Fi communication system, 802.11 communication system, cellular communication system, 3G, 4G, 5G, or LTE communication systems, or other communication systems. In other embodiments, communication system 214 may comprise a wireline communication system such as, and without limitation, a Universal Serial Bus (USB), micro-USB, wired Ethernet, or other communication systems. In one embodiment, the communication system 214 may comprise a transmitter for transmitting data, a receiver for receiving data, an encoder for encoding data for transmission, and a decoder for decoding data that is received.

Digital signature generator 211 is configured to allow signing of data using the private key 221. For example, in one embodiment, digital signature generator 211 may be configured to sign a digital challenge 309 that is received through the communication system 214. Read access system 213 may allow read access to some values stored on the processor 110 through the communication system 214. In one embodiment, read access system 213 allows reading the public key 222. In embodiments, the read access system 213 does not allow access to the private key 221 and there is no functionality to access the private key 221, in order to preserve the secrecy of the private key 221. It is preferable that the private key 221 never be exposed and that the processor 110 only prove ownership of the private key 221 through proofs (e.g. a digital signature) and without disclosing the private key 221 itself. Although it may be possible in some instances for a hacker, with determined effort, to break into the processor 110 to access the private key 221, there is preferably no functionality designed into the processor 110 to access the private key 221.

Self-attestation system 212 allows the processor 110 to attest to its configuration in response to a query received from an external computer device 301 through the communication system 214. In an embodiment, the self-attestation system 212 attests that the processor 110 is not or was never in a state where the manufacturer of the processor 110 could have placed the private key 221 on the processor 110, rather than allowing the processor 110 to generate the private key 221.

In an embodiment, the secure aspects of the processor 110 may be hardcoded into the processor 110 so that they are secure against modification. For example, hardcoding may be performed by implementing functionality in hardware through special purpose circuits or in microcode. Microcode comprises computer instructions stored in memory but differs from software and firmware in that it is designed to never be updated or modified and instead persists unchanged through the life of the processor 110. In one embodiment, microcode may be stored in read-only memory (ROM). In an embodiment, the key generator 210, digital signature generator 211, and self-attestation system 212 are implemented in microcode or in special purpose hardware so that they are not vulnerable to change. One of the disadvantages of current systems is the use of software or firmware to implement private key generation or storage, which leaves these systems vulnerable to bugs or hacking because of the ease of accessing and modifying software and firmware. In one embodiment, the microcode and hardware implementing the secure functions of the processor are published and auditable. Software and firmware of the processor 110 that implements non-secure functionality may also be published and auditable.

Key generator 210 may use any of a variety of processes to generate private key 221 and corresponding public key 222. In one embodiment, key generator 210 uses a physically unclonable function (PUF) to generate the private key 221. A PUF uses entropy in physical structure, to generate true, or close to true, random numbers. PUF may be based on variations in the physical structure of the processor 110 due to manufacturing variations. Variations at a microscopic level requiring magnification of at least 25× to be revealed may be referred to as variations in the microstructure of a processor 110. For example, physical variations that may be used for a PUF include microscopic manufacturing variations in the silicon wafer of a chip. These physical imperfections would vary between processors even of the same model and production line and cannot be read or copied by the manufacturer of the chip because they happening at such a small scale. Each processor 110 is therefore able to generate a unique private key 221 that differs from all other private keys of other processors and cannot be read by the manufacturer.

In other embodiments, key generator 210 may use other methods for generating a private key 221, such as using a random number generator based on a seed value. If the seed value is provided by the manufacturer, then this may pose the risk of reconstruction of the private key 221 by the manufacturer. However, if the manufacturer implements auditable and verifiable processes that the manufacturer can never read, or at least not copy, the seed value, then this may be sufficiently secure.

In general, key generator 210 may rely on pseudo-random number generation, where numbers are not truly random, or true random number generation. The key private key 221 and public key 222 may use any form of public key cryptography such as elliptic curve cryptography, Digital Signature Standard (DSS), RSA, and others.

In one embodiment, communication with the processor 110 is performed using an Application Programming Interface (API), which is a predefined set of functions, protocols, or standards for accessing data or functionality, over the communication system 214. The API may control access to the data on the processor 110 such that, for example, public data is accessible including the public key 222 and the ability to trigger the execution of predefined functionality in the self-attestation system 212, digital signature generator 211, and read access system 213. In one embodiment, there is no API access to the private key 221 or key generator 210 (other than, optionally, to causing the key generator to generate the initial keys or attest that they have already been created).

Figure 3A:
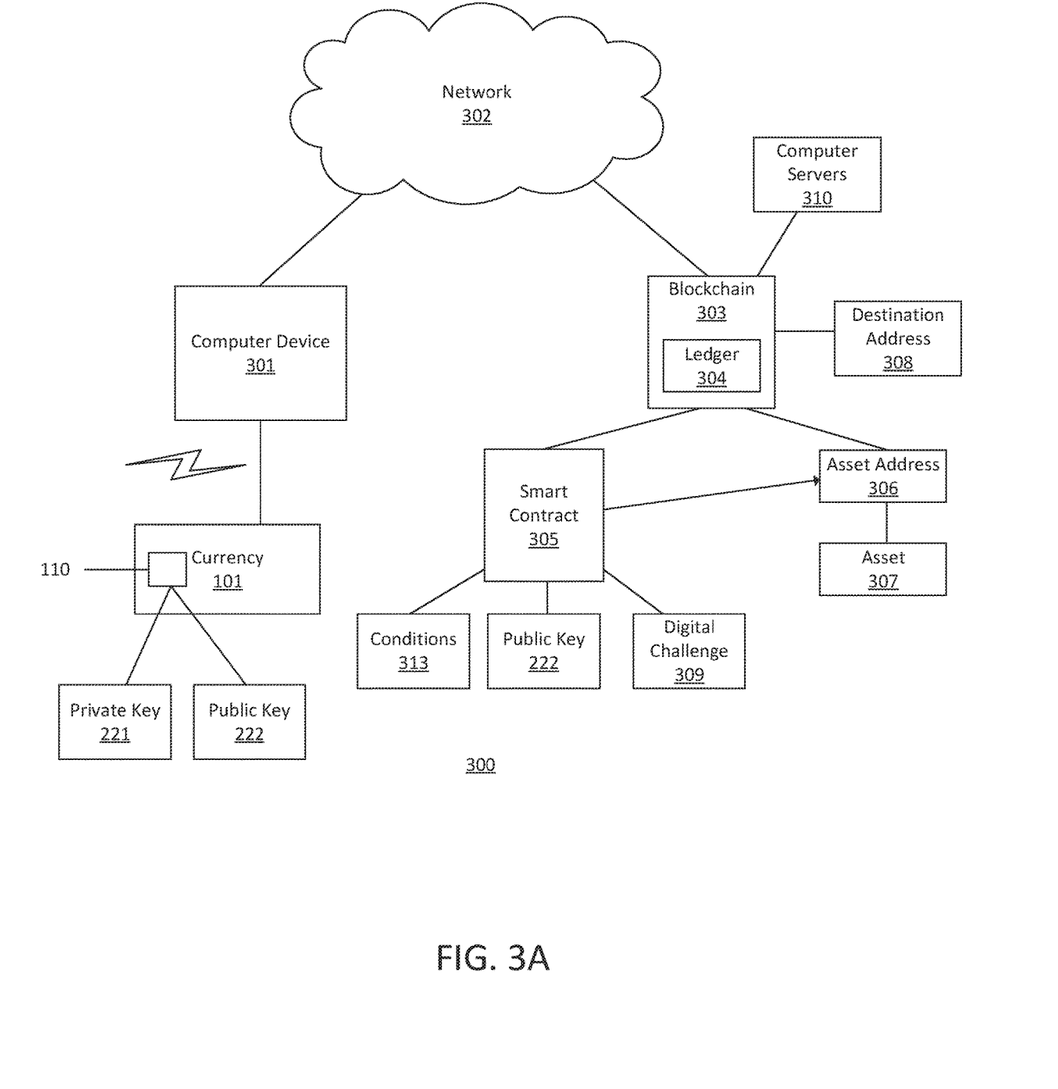
FIG. 3A illustrates an exemplary environment where an embodiment may operate.

FIG. 3A illustrates an exemplary environment 300 where an embodiment may operate. Currency 101 may comprise a processor 110 including a private key 221 and public key 222. The processor 110 may transmit and receive data from an external computer device 301. The computer device 301 may be any computer system including, without limitation, mobile devices, smart phones, cell phones, Internet of Things (IoT) devices, smart watches, smart glasses, desktops, laptops, notebooks, digital assistants, and any other computerized device. The computer device 301 may be connected to other computer systems via network 302, which may comprise, for example, an intranet, the Internet, a network of networks, the public switched telephone network (PSTN), a local area network (LAN), a wide area network (WAN), cellular networks, or any other kind of network.

The computer device 301 may include a communication system for transmitting and receiving data from processor 110. The communication system may comprise a wireless communication system such as, and without limitation, a radio transmitter, Bluetooth communication system, Wi-Fi communication system, 802.11 communication system, cellular communication system, 3G, 4G, 5G, or LTE communication systems, or other communication systems. In other embodiments, the communication system may comprise a wireline communication system such as, and without limitation, a Universal Serial Bus (USB), micro-USB, wired Ethernet, or other communication systems. In one embodiment, the communication system may comprise a transmitter for transmitting data, a receiver for receiving data, an encoder for encoding data for transmission, and a decoder for decoding data that is received. Computer device 301 may be used to query the smart contract 305 and verify that it is associated with public key 222 and private key 221 of processor 110 and determine and verify the existence of the asset 307 that is associated with the smart contract 305.

Blockchain 303 may be accessible to computer device 301 and other computers over the network 302. The blockchain 303 may comprise a decentralized system for exchange of assets or execution of functionality. In one embodiment, blockchain 303 is implemented by a plurality of computer servers 310 that implement a predefined, distributed protocol, such that no single computer or small group of computers may gain control over the blockchain 303. Thus, the blockchain 303 commonly includes predefined behavior according to a known protocol without control by any central authority.

Blockchain 303 may include a central transaction ledger 304 where all or some of the transactions performed by the blockchain 303 may be stored. Transactions may be added to the ledger through the operation of the plurality of computer servers 310 implementing the blockchain, which may be referred to as miners. In an embodiment, the validity of each historical transaction and the current balances associated with blockchain wallets may be verified from the ledger 304.

Smart contract 305 may be stored on the blockchain 303. The smart contract 305 may comprise self-executing instructions, which are guaranteed to occur according to their specification (e.g., code) by implementation on the blockchain 303 and execution by computer servers 310, without requiring an external authority such as a court system or police force for execution or enforcement. In one embodiment, a smart contract 305 is trackable and irreversible. Moreover, the code of the smart contract 305 may be publicly readable to allow verification by parties to the contract and other parties on the blockchain 303.

Smart contract 305 may comprise a contract to access and use asset 307 that is located on the blockchain 303 at an address 306. In one embodiment, by design only the smart contract 305 may access or transfer asset 307 at address 306. In one embodiment, the smart contract 305 may comprise instructions to transfer the asset 307 from its address 306 to a destination address 308 entered by the user and owner of the smart contract. The destination address 308 may comprise a wallet of the user who owns the physical cryptocurrency 101.

In one embodiment, asset 307 may be a real-world asset that is represented on a blockchain through a cryptographic token or a smart contract. Such real-world assets may include, without limitation, vouchers, tickets, certificates of stock or bond ownerships, real estate, vehicles, trading cards, collectable cards or tokens, casino chips, documents, passports, licenses, certified mail, invoices, receipts and other real-world objects. In one embodiment, ownership of the real-world asset may be tied to a non-fungible token or NFT so that the owner of the NFT is entitled to ownership of the real-world asset. For example, a holder of the NFT may redeem the NFT to a third party holding the real-world asset in order to receive the real-world asset. One example would be a physical trading card that is represented on the blockchain through a non-fungible token and includes a processor 110.

In an embodiment, the smart contract 305 may also comprise public key 222 that is tied to the currency 101. The public key 222 is derived from private key 221 and may indicate who will be able to trigger execution of the smart contract 305. In an embodiment, the smart contract 305 may require a digital challenge signed by private key 221 before execution. For example, the smart contract, blockchain 303, or computer device 301 may generate a digital challenge 309 and transmit it to the processor 110. Processor 110 may then sign the digital challenge 309. The smart contract 305 receives the signed digital challenge and verifies it using the public key 222. In one embodiment, the smart contract 305 verifies the signed digital challenge 309 with the public key 222. This verifies that the entity providing the signed challenge to smart contract 305 has access to the signing function of processor 110.

The smart contract 305 may also comprise a set of conditions 313, which may be specified in the publicly viewable code of the smart contract 305, that must be met for the smart contract 305 to execute. For example, in one embodiment, the conditions 313 include a time-lock that prevents the smart contract 305 from executing before a predefined date or time has occurred. The date or time may be a specified date or time such as Jan. 1, 2024 at 10:00 AM GMT or may be an elapsed time such as 100 days in the future. The date or time may also be specified as a block number in a blockchain to indicate that when that block becomes available on the blockchain, the smart contract may be executed. The date or time of release may be specified in the public code of the smart contract 305 so that others on the blockchain 303 may determine when the smart contract 305 may be executed. Moreover, the date or time of release may be denoted on the physical currency as an expiration date or time 112 to notify users of the date on which the cryptocurrency underlying the physical currency may be transferred.

In one embodiment, other optional conditions 313 in addition to or alternatively to a date or time limitation include requiring one or multiple authenticators in addition to, or alternatively to, the private key 221 to be presented, such as a signature of a second private key. Possession of the second private key may be proven by signing a second digital challenge (which may be the same as the digital challenge 309 or different) with the second private key. For example, the second private key may be tied to the identity of the user or may be held by another trusted entity like a bank, a friend, or another third party. Additional authenticators may be independent public-private key pairs or they may constitute additional cryptographic material stored on the processor or multiple processors. In one embodiment, the private key and second (or additional) private keys are all needed to execute the contract 305. In one embodiment, the private key or the second (or additional) private keys are needed to execute the contract 305. Private keys or cryptographic material may constitute part of a multisignature scheme like Shamir's Secret Sharing or Schnorr signatures. Alternatively, additional authenticators may be part of a larger key hierarchy. Additional cryptographic material or schemes could be used in an escrow scenario to control functions on the smart contract or in conjunction with other conditions. For instance, one private key may be able to generate a signature that gives immediate access to the digital asset stored in an associated smart contract whereas another may be time-locked such that its access is delayed. Another optional condition to smart contract 305 includes requiring an additional input on smart contract 305 to be triggered, where the additional input may correspond to any input that may be monitored by the smart contract 305. Another optional condition to smart contract 305 includes entering a password to unlock execution of the smart contract 305.

When the conditions 313 have been met, then the smart contract 305 may execute and transfer asset 307 from asset address 306 to destination address 308.

Cryptocurrencies generally require the use a specific cryptographic protocol, whereas because the physical cryptocurrency accesses the asset 307 through a smart contract 305, instead of directly, it allows any public key cryptographic protocol to be used by the processor 110, without being limited to those that may underlie the asset 307. This allows the physical cryptocurrency to be disaggregated from the cryptographic protocol used by any particular digital cryptocurrency.

Figure 3B:
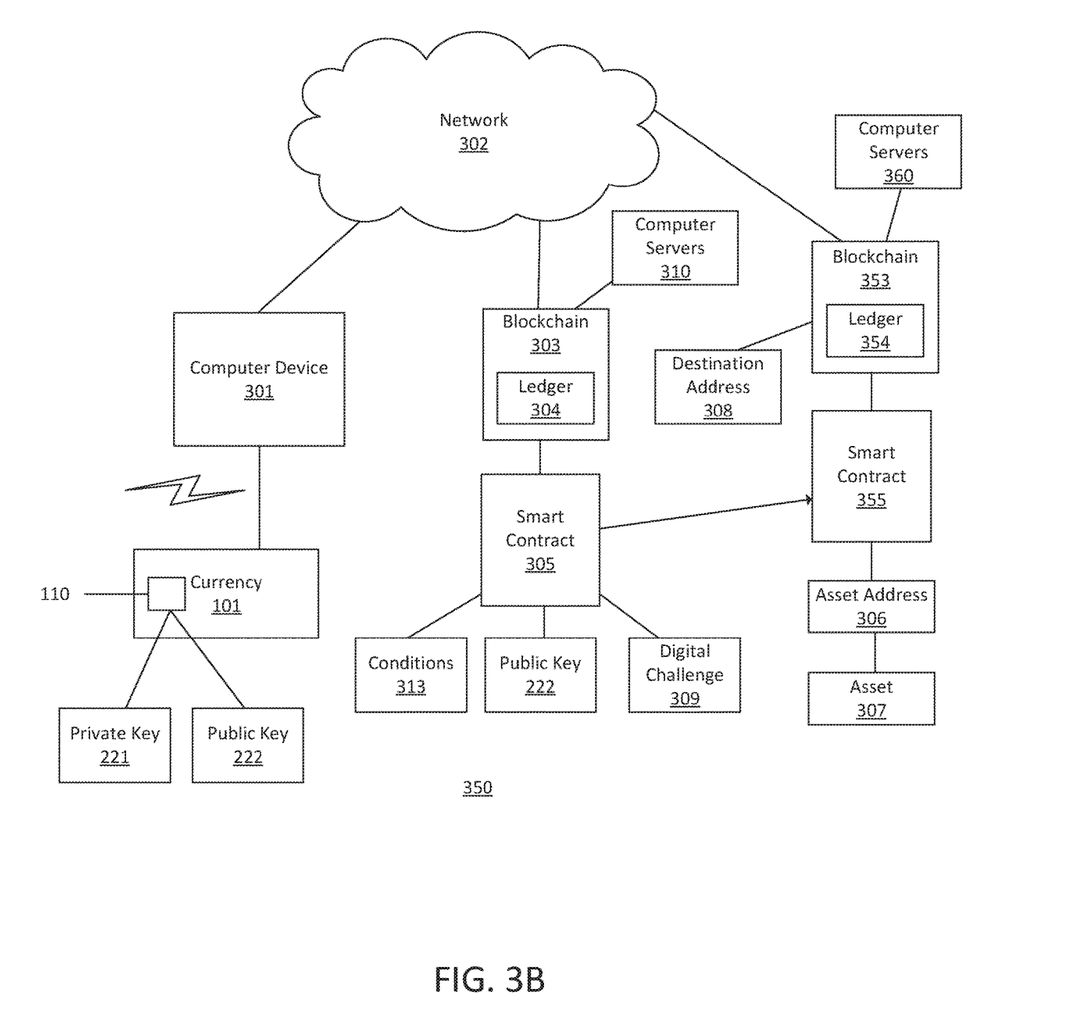
FIG. 3B illustrates an exemplary environment where an asset and a smart contract are on different blockchains.

FIG. 3B illustrates an exemplary environment 350 where the asset 307 and smart contract 305 are on different blockchains. The exemplary environment 350 operates similarly to environment 300. However, the asset 307 is at an asset address 306 that is on a blockchain 353, with ledger 354 and implemented by computer servers 360, that is different than blockchain 303 where smart contract 305 is located. Smart contract 305 on blockchain 303 may access asset 307 through a link to smart contract 355, which is enabled to transfer the asset 307 from address 306 to destination address 308. Blockchain 303 and blockchain 353 may use different cryptographic platforms that use different cryptographic protocols. For example, blockchain 303 may comprise Ethereum and blockchain 353 may comprise Bitcoin. Any other combination of blockchain protocols may be used for blockchain 303 and blockchain 353. Network 302 may rely on a combination of smart contracts and cryptographic algorithms to structure information exchange between blockchains 303 and 353.

Figure 4A:
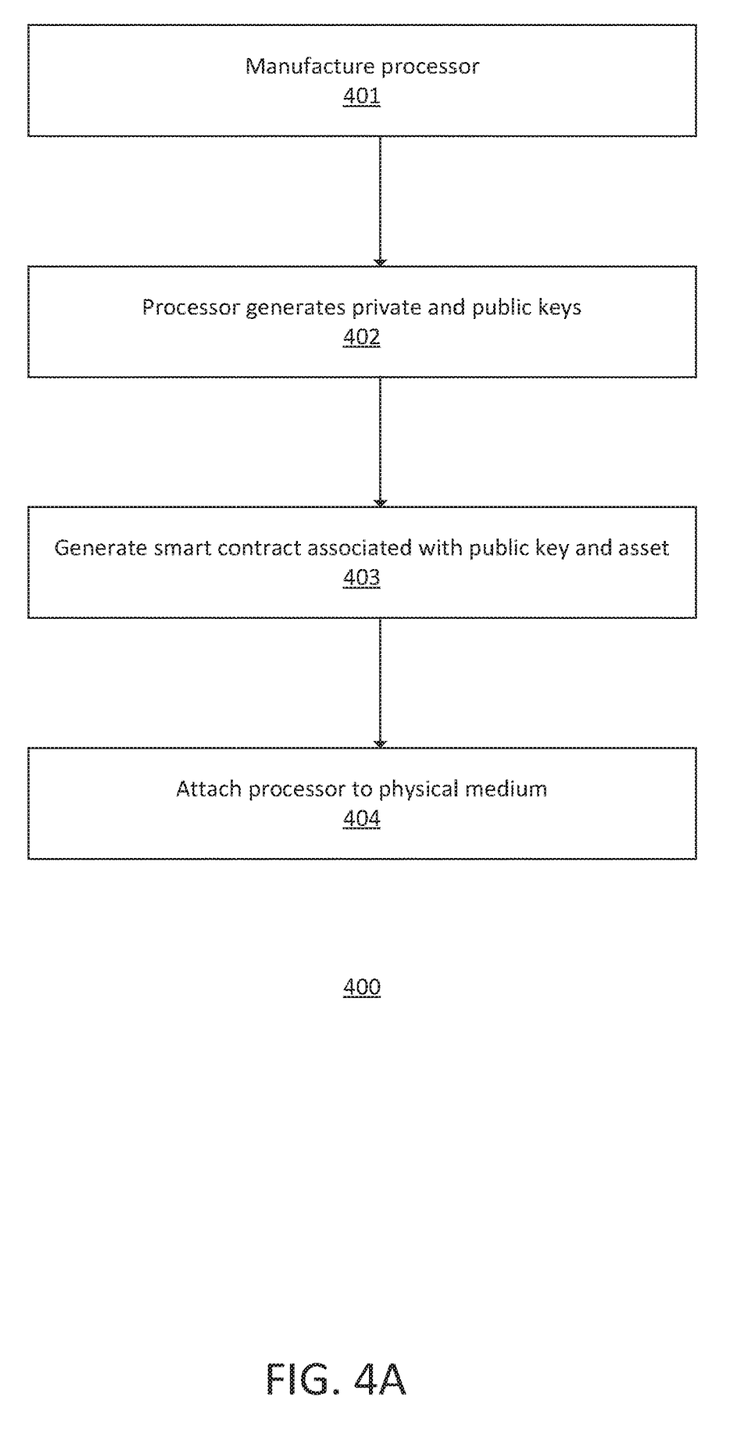
FIG. 4A illustrates an exemplary method that may be performed in an embodiment for manufacturing physical cryptocurrency.

FIG. 4A illustrates an exemplary method 400 that may be performed in an embodiment for manufacturing physical cryptocurrency, a process which may also be referred to as minting. In step 401, the processor 110 may be manufactured. The private key 221 and public key 222 are not yet generated, but the key generator 210, digital signature generator 211, self-attestation system 212, read access system 213, and communication system 214 are created in the processor 110 as part of the manufacturing process. In step 402, the processor 110 generates the private key 221 and public key 222 and stores them in memory. In step 403, a smart contract is generated and associated with the public key 222 and an asset 307. The public key 222 may be read from the processor 110 to generate the smart contract. In step 404, the processor 110 is attached to physical medium 101. The steps of method 400 may be performed in different orders or in parallel. For example, optionally, step 404 may be performed prior to steps 402 or 403.

Figure 4B:
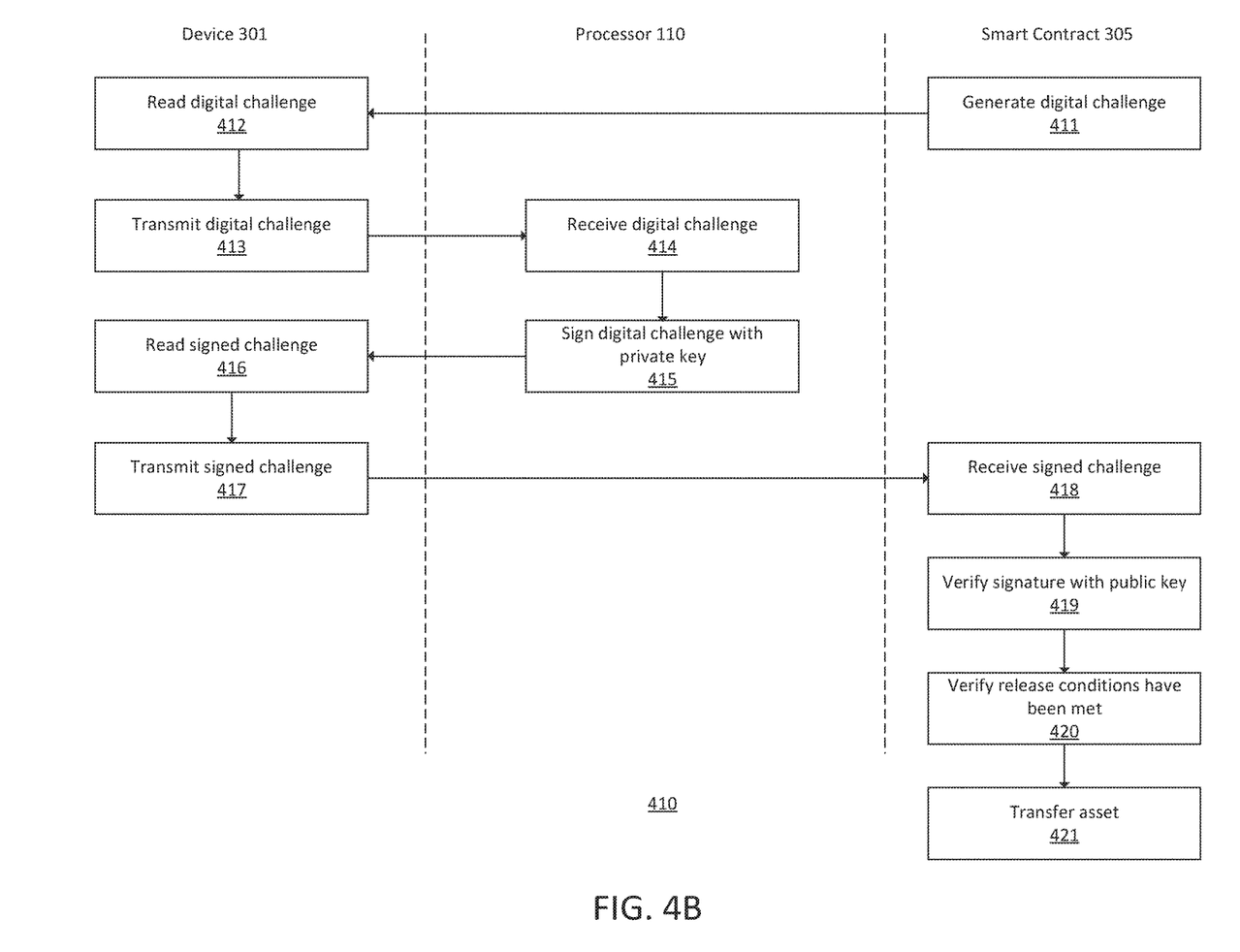
FIG. 4B illustrates an exemplary method for using a processor embedded in a physical cryptocurrency to access an asset.

FIG. 4B illustrates an exemplary method 410 for using the processor 110 embedded in the physical cryptocurrency to access the asset 307. The method 410 is illustrated showing steps performed by the computer device 301, the smart contract 305, and the processor 110. In step 411, the smart contract 305 generates a digital challenge. In one embodiment, the user may enter a requested destination address in the computer device 301, where the asset 307 should be transferred. In one embodiment, the digital challenge may include the user-specified destination address 308 for the transfer of the asset 307. In step 412, the computer device 301 reads the digital challenge from the smart contract. In one embodiment, the computer device 301 does not read the digital challenge itself but it uses information from the smart contract 305 to structure a digital challenge with a specific format that is acceptable to smart contract 305. In step 413, the computer device 301 transmits the digital challenge to the processor 110. In step 414, the processor 110 receives the digital challenge. The transmission may occur through network 302. In step 415, the processor 110 may sign the digital challenge with the private key 221. In step 416, the computer device 301 may read the signed challenge from the processor 110. The transmission of the signed digital challenge may occur through network 302 from processor 110 to computer device 301. In step 417, the computer device transmits the digital challenge to the smart contract 305. In step 418, the smart contract 305 receives the signed challenge. In step 419, the smart contract 305 verifies the signature with public key 222. If verification fails, then the process may stop. If verification succeeds, the process continues at step 420, wherein the smart contract 305 verifies that its release conditions have been met. If the release conditions are not met, then the smart contract 305 does not execute. However, if the release conditions are met, then, in step 421, the smart contract 305 transfers the asset 307 from its starting address 306 to the user-specified destination address 308.

In an embodiment, processor 110 may be associated with blockchain 303, or a separate blockchain from blockchains 303 and 353, that allows validation and verification of the processor 110 independently of the smart contract 305. In one embodiment, the processor 110 may be insured against potential losses in the event that it is determined that the private key 221 is extractable from the processor 110 or otherwise insecure.

In an embodiment, physical medium 101 may include electrical connections embedded in the physical medium 101 that are affected when the physical medium 101 is damaged. The electrical connections may be broken or their resistance, capacitance, or other electrical properties may be changed due to the physical change in the physical medium 101. The break or change in the electrical properties of the electrical connections may then be detected by the processor 110 and change how the digital signature generator 211 signs data. For example, when the physical medium 101 is damaged, the digital signature generator 211 may decline to sign digital challenges or decline to sign some digital challenges that contain predefined strings of data. In other embodiments, the digital signature generator may indicate in metadata of a signature that the physical medium 101 has been damaged.

In an embodiment, anti-counterfeiting measures are included in the physical cryptocurrency. Micro-printing, holograms, and use of hard to fabricate or clone materials may be included in the physical medium 101 or secure processor 110. In an embodiment, the processor 110 is connected to the physical medium 101 by a circuit, such that removing the processor 110 from the physical medium 101 sends signal to the processor 110 that it has been removed. In response, the processor 110 may decline to issue further digital signatures or may store metadata in signatures indicating that it has been removed from the physical medium 101.

In an embodiment, the key generator 210 includes a key re-generation capability to re-generate a new private key 221 and public key 222. The key re-generation capability may be used when there is a risk that a hacker has comprised the existing private key 221 of the processor 110. In one embodiment, the key generator 210 may generate a new private key 221 and public key 222 and store them in memory of the processor 110. The processor 110 may verify possession of the old private key to the smart contract 305 by signing a digital challenge in a format specified by the smart contract 305 and transmit the replacement public key to the smart contract 305. The smart contract 305 may then replace its public key with the replacement public key.

In an embodiment, the design of the processor 110 is open sourced to allow for auditing of the operation of the processor 110. Open sourcing the design of the processor 110 would reduce the need for trust in the design of the processor 110.

In an embodiment, a physical cryptocurrency may include a plurality of processors 110 in the physical medium 101, where each processor 110 comprises a different public-private key pair. Smart contract 305 may require multiple signatures to execute the contract, such as the private key of each processor 110 on the physical medium 101 of a single cryptocurrency. This multi-signature protocol reduces the reliance on any one processor and increases overall robustness of the system.

In an embodiment, multiple assets 307 may be associated with a single physical cryptocurrency. In one embodiment, a single physical cryptocurrency may be associated with multiple smart contracts 305 by having multiple private keys 221 with corresponding public keys 222, each public key 222 corresponding to one of the smart contracts 305. In other embodiments, a single physical cryptocurrency may be associated with one smart contract 305 and the smart contract 305 may control the transfer of a plurality of assets 307.

In an embodiment, processor 110 may use methods other than public key cryptography to prove possession of private key 221. In an embodiment, processor 110 may prove possession of private key 221 by using zero knowledge proofs such as zkSNARKs or zkSTARKs. In an embodiment, processor 110 may prove possession of private key 221 by using lattice cryptography. The smart contract 305 may use the aforementioned protocols to request processor 110 to prove it possess private key 221 and, once processor 110 satisfies proof of possession, the smart contract 305 may self-execute subject to conditions 313.

In an embodiment, the physical medium 101 may include a physical timing mechanism that denotes or determines the expiration date of the physical cryptocurrency. In an embodiment, a radioactive material with a known half-life may be attached to the physical medium 101. The decay of the radioactive material may cause the radioactive material or the physical medium 101 to display an indication (e.g., a change in color) at a predetermined time, when the decay has reached a certain level to indicate that the physical cryptocurrency has expired. In one embodiment, processor 110 may include a sensor to measure the radioactive material and determine when a certain amount of decay has occurred. In response to detecting that a threshold amount of decay has occurred, the processor 110 present a notification that the physical cryptocurrency has expired. Moreover, optionally, when the radioactive decay has reached a predetermined threshold, the private key 221 may be exposed in an embodiment, such as being visually denoted on the physical medium 101 or made accessible through the processor 110.

In an embodiment, the physical medium 101 may include a display screen connected to the processor 110. The display screen may display the asset associated with the physical cryptocurrency, the date of expiration, and the remaining amount of asset that is available on the blockchain.

A number of implementations have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps may be eliminated, from the described flows, and other components can be added to, or removed from, the described systems. Accordingly, other implementations are within the scope of the following claims.

What is claimed is:

1. A system for use of a physical cryptocurrency comprising:
 a physical currency, the physical currency denoting an asset and comprising a processor, wherein the processor includes an API for accessing data on the processor;
 a cryptographic key generator hardcoded in the processor, the cryptographic key generator configured to generate a private key and corresponding public key;
 the private key, stored in a memory of the processor such that the private key is not accessible via the API;
 a communications system in the physical currency for transmitting and receiving data from a remote device;
 one or more sewers;
 the remote device, wherein the remote device is communicably connected to the one or more servers comprising a smart contract on a blockchain;
 the smart contract, wherein the smart contract stores a copy of the public key and comprises code for transferring the asset from an address on the blockchain to a user-specified destination address;
 a digital signature generator hardcoded in the processor, the digital signature generator configured to receive a digital challenge generated by the smart contract, sign the digital challenge using the private key, the smart contract containing code to cryptographically verify that the private key associated with the public key stored in the contract was used to sign the digital challenge, the smart contract configured to transfer ownership of the asset when presented with a valid signature.

2. The system of claim 1, wherein the private key is generated using a physically unclonable function (PUF), the PUF generating the private key based on variations in a physical microstructure of the processor.

3. The system of claim 1, wherein the smart contract includes a time lock that prevents transfer of the asset until a predefined date or time.

4. The system of claim 1, wherein the cryptographic key generator is configured to generate the private key and public key using elliptic curve cryptography.

5. The system of claim 1, wherein the processor comprises a self-attestation system hardcoded in the processor, the self-attestation system configured to attest to processor configuration in response to a request from the remote device through the communications system wherein attesting to processor configuration comprises verifying that the private key was generated by the cryptographic key generator in the processor and not generated externally.

6. The system of claim 1, wherein the cryptographic key generator is configured to generate the private key and public key using microcode only, without firmware or software.

7. The system of claim 1, further comprising electrical connections embedded in the physical currency for detecting damage to the physical currency;
 wherein the processor is configured to detect a change in electrical properties of the electrical connections indicative of damage to the physical currency.

8. The system of claim 1, wherein the smart contract is accessible through a multi-signature cryptographic protocol.

* * * * *

UNITED STATES PATENT AND TRADEMARK OFFICE
CERTIFICATE OF CORRECTION

PATENT NO. : 10,896,412 B2  
APPLICATION NO. : 16/351478  
DATED : January 19, 2021  
INVENTOR(S) : Charles Cameron Robertson et al.

Page 1 of 1

It is certified that error appears in the above-identified patent and that said Letters Patent is hereby corrected as shown below:

In the Claims

In Claim 1, Column 2, Line 13, "one ore more sewers" should be --one or more servers--.

Signed and Sealed this
Second Day of March, 2021

Drew Hirshfeld
*Performing the Functions and Duties of the
Under Secretary of Commerce for Intellectual Property and
Director of the United States Patent and Trademark Office*